US008204941B1

(12) United States Patent
Schlesener et al.

(10) Patent No.: US 8,204,941 B1
(45) Date of Patent: Jun. 19, 2012

(54) PRESENCE UPDATING WITH PREFERRED SERVICE DETERMINATION

(75) Inventors: Matthew C. Schlesener, Olathe, KS (US); Pallavur Sankaranaraynan, Overland Park, KS (US); Brian D. Mauer, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1681 days.

(21) Appl. No.: 11/232,699

(22) Filed: Sep. 22, 2005

(51) Int. Cl.
 *G06F 15/16* (2006.01)
(52) U.S. Cl. .......................... 709/206; 709/204
(58) Field of Classification Search .............. 709/206, 709/204
See application file for complete search history.

(56) References Cited

U.S. PATENT DOCUMENTS

| | | | |
|---|---|---|---|
| 2003/0009530 A1* | 1/2003 | Philonenko et al. | 709/206 |
| 2003/0016630 A1* | 1/2003 | Vega-Garcia et al. | 370/252 |
| 2004/0103149 A1* | 5/2004 | Tanigawa et al. | 709/204 |
| 2006/0190117 A1* | 8/2006 | Weczorek et al. | 700/103 |
| 2007/0237135 A1* | 10/2007 | Trevallyn-Jones et al. | 370/354 |

* cited by examiner

*Primary Examiner* — Dustin Nguyen
*Assistant Examiner* — Joel Mesa

(57) ABSTRACT

A presence management system comprising a communication system configured to transmit a first update message indicating a first presence status of a user for a first service, and transmit a second update message indicating a second presence status of the user for a second service, and an access control system configured to receive the first and second update message, process the first and second update messages to determine a preferred service for the user of the first and second services, and transmit a third update message to a presence system indicating the user and the preferred service for the user wherein the presence system updates a presence indicator for the user to indicate the preferred service.

19 Claims, 8 Drawing Sheets

PRESENCE UPDATING WITH PREFERRED SERVICE DETERMINATION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The field of the invention relates to communications, and in particular, to presence updates with preferred service determination.

2. Description of the Prior Art

Recent convergence in communication technologies has resulted in the increased popularity of a diverse range of communication services that are offered over common platforms. For example, voice over packet calling and instant messaging can be provided through a single handheld computing device, such as a mobile phone or personal computer.

One problem with the increased use of converged services is that the demands placed on networks often times exceed network capacity. When the capacity of a network degrades, the quality of service experienced by end users suffers. For instance, the service requirements of a large number of VoP users could easily outstrip the bandwidth capacity of an enterprise network. As a result, users could experience service degradation in the form of delay and jitter. Other functions of the network, such as data services, could also degrade. In another problem, users often times access multiple services simultaneously, such as conducting a VoP call and an instant message session at the same time, further straining network capacity.

In another problem, the common use of presence features has presented several challenges to network operations in a converged environment. Presence features are used to alert third parties of the status of a particular user with respect to the various services and devices used by the user. For instance, the user can adjust his presence to indicate that he is available to receive instant messages, but is not available for voice calls. In addition, a user can adjust his presence to indicate whether he is at his desk or traveling.

While presence features have several benefits, such as improving team operations, they also have several drawbacks. For example, presence features encourage third parties in other networks to immediately and indiscriminately contact users when their presence indicates availability. The increased load placed on networks due to third party interaction only adds to the stress already placed on the networks.

SUMMARY OF THE INVENTION

An embodiment of the invention helps solve the above problems and other problems by providing systems, methods, and software that allow for improved network operations by determining on a user by user basis a preferred service for communicating with users. Network access can be limited to preferred services and third parties can be notified of the preferred services through the use of presence features. In an embodiment of the invention, a presence management system comprises a communication system configured to transmit a first update message indicating a first presence status of a user for a first service, and transmit a second update message indicating a second presence status of the user for a second service, and an access control system configured to receive the first and second update message, process the first and second update messages to determine a preferred service for the user of the first and second services, and transmit a third update message to a presence system indicating the user and the preferred service for the user wherein the presence system updates a presence indicator for the user to indicate the preferred service.

In an embodiment of the invention, the access control system determines the preferred service based on a first service requirement for the first service and a second service requirement for the second service.

In an embodiment of the invention, the access control system determines the preferred service based on a first service requirement for the first service and a second service requirement for the second service by processing the first service requirement and the second service requirement with a capability constraint of an access network to determine which of the first service requirement or the second service requirement satisfies the capability constraint of the access network.

In an embodiment of the invention, the capability constraint comprises a bandwidth constraint, the first service requirement comprises a first bandwidth requirement, and the second service requirement comprises a second bandwidth requirement.

In an embodiment of the invention, the first service comprises a voice over packet service.

In an embodiment of the invention, the second service comprises an instant messaging service.

In an embodiment of the invention, the communication system comprises a first device and a second device wherein the first device corresponds to the first service and wherein the second device corresponds to the second service.

BRIEF DESCRIPTION OF THE DRAWINGS

The same reference number represents the same element on all drawings.

DETAILED DESCRIPTION OF THE PREFERRED EMBODIMENT

FIGS. 1-8 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

FIGS. 1-4

Figure 1:
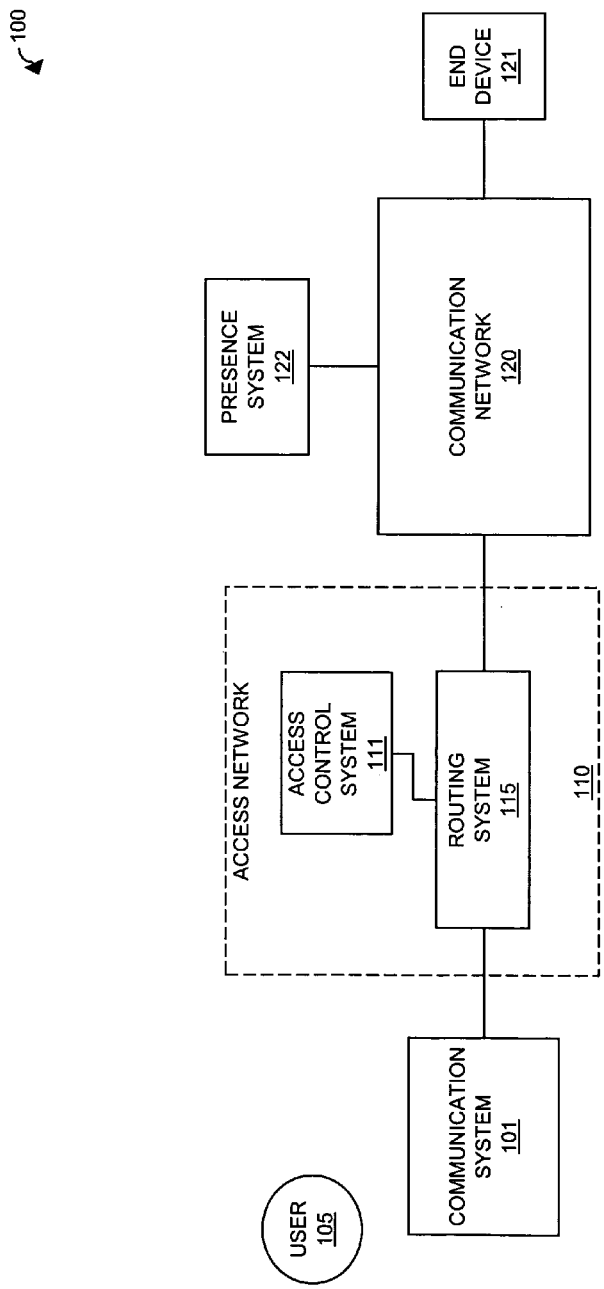
FIG. 1 illustrates a presence network in an embodiment of the invention.

FIG. 1 illustrates presence network 100 in an embodiment of the invention. Presence network 100 allows for improved network operations by determining on a user by user basis a preferred service for communicating with users. Presence network 100 includes access network 110 and communication network 120. Access network 110 includes routing system 115 and access control system 111. Access network 110 provides communication system 101 with access to communication network 120. Communication system 101 is coupled to routing system 115. Routing system 115, in turn, is coupled to communication network 120 and access control system 111. Presence network 100 further includes presence system 122 and end device 121 coupled to communication network 120.

Communication network 120 could be any network or collection of interconnected networks capable of carrying traffic for services. Communication network 120 could be, for example, a public internet, an intranet, a private internet, a local area network (LAN), a wide area network (WAN), a wireless network, or a wireline network, as well as other types of networks.

Access network 110 could be any network or collection of networks capable of providing access for a service to communication network 120. Access network 110 could be, for example, a public internet, an intranet, a private internet, a local area network (LAN), a wide area network (WAN), a wireless network, or a wireline network, as well as other types of networks. Routing system 115 could be any well known system capable of routing traffic to and from communication system 101 and communication network 120. Routing system 115 could include network elements such as routers, packet switches, border controllers, gateways, gateway controllers, and firewalls, as well as other types of network elements.

Communication system 101 could be any system capable of interfacing service traffic between user 105 and access network 110. A service could be any packet communication service, such as a voice or video over packet (VoP), data, or instant messaging service, as well as other services. Service traffic could be bearer traffic, such as voice communications, or control traffic, such as control messages. End device 121 could be any communication device capable of exchanging traffic for a service with communication system 101.

Figure 2:
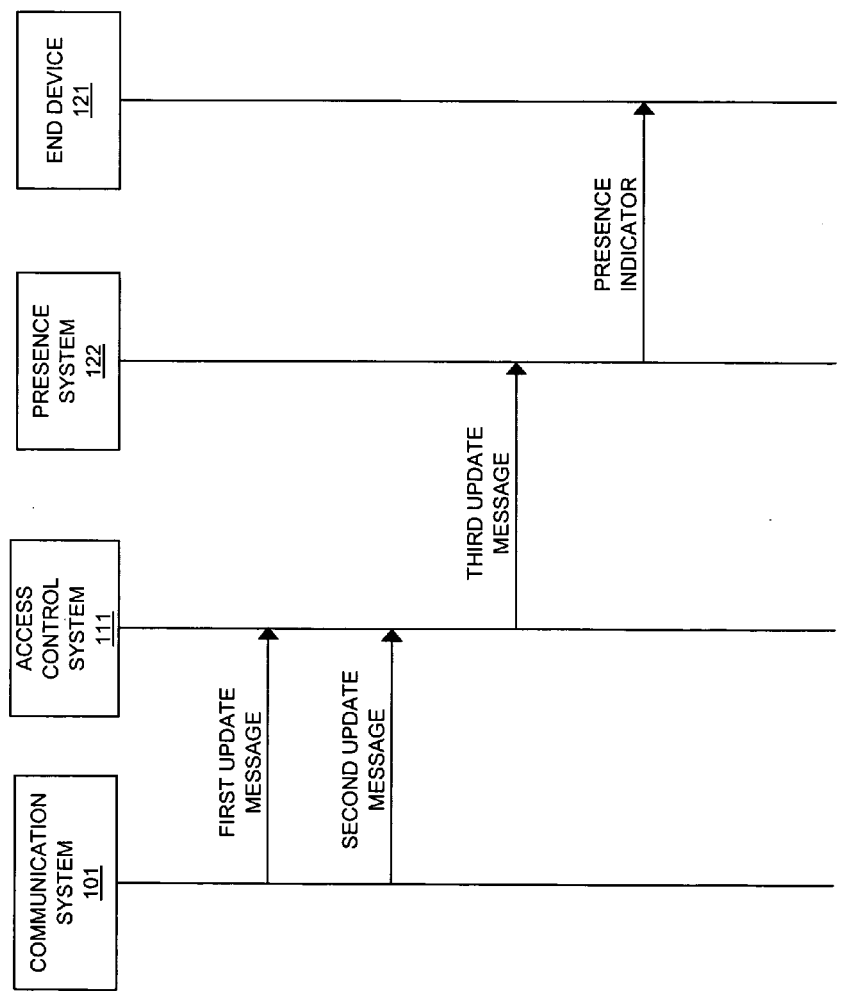
FIG. 2 illustrates a flow diagram in an embodiment of the invention.

FIG. 2 illustrates a flow diagram of the operation of presence network 100 in an embodiment of the invention. In operation, communication system 101 is capable of hosting multiple packet services, such as VoP and instant messaging. Further in operation, communication system 101 communicates with presence system 122, via access control system 101, to keep presence system 122 updated with the current presence status of user 105 with respect to the multiple service supported by communication system 101. Presence system 122 then communicates the presences status of user 105 to other interested communication systems, such as end device 121.

As illustrated in FIG. 2, communication system 101 transmits a first update message indicating a first presence status of user 105 for a first service to access control system 111. The first service could be, for example, a VoP service. Communication system 101 then transmits a second update message indicating a second presence status of user 105 for a second service to access control system 111. The second service could be, for example, instant messaging. Access control system 111 receives and processes the first and second update messages to generate a third update message. The third update message indicates a preferred service for user 105 of the first and second services. Access control system 111 transmits the third update message to presence system 122. Presence system 122 updates a presence indicator associated with user 105 to indicate the preferred service.

Figure 3:
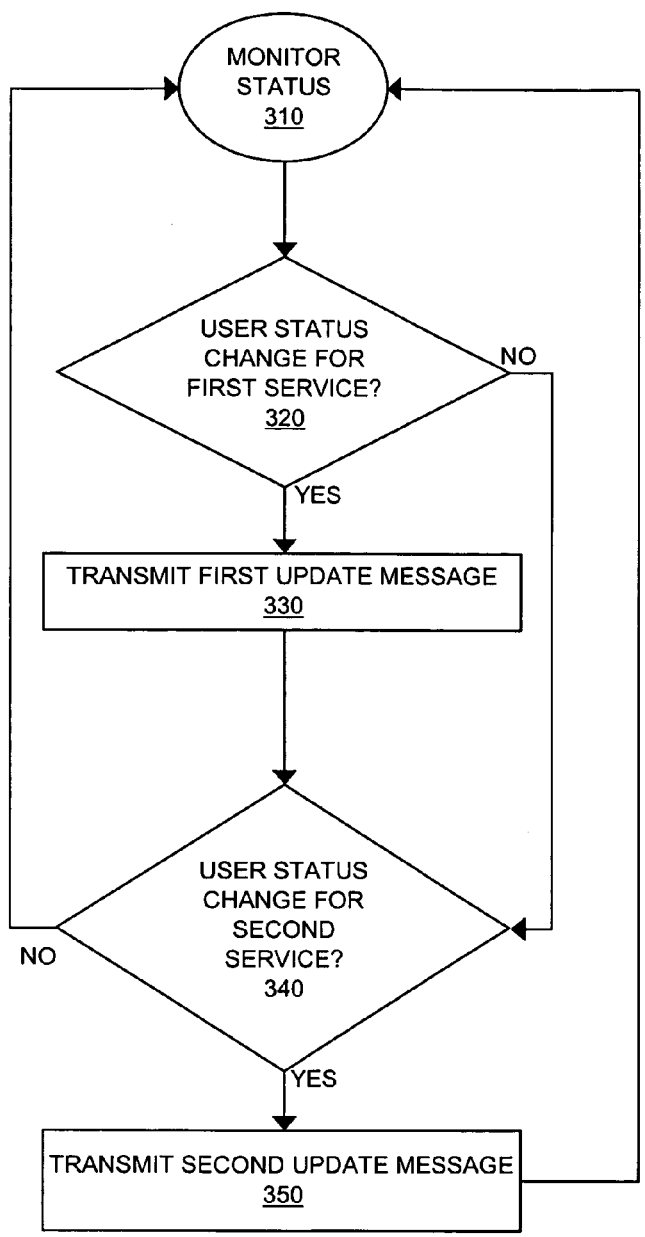
FIG. 3 illustrates the operation of a communication system in an embodiment of the invention.

FIG. 3 illustrates the operation of communication system 101 in an embodiment of the invention. To begin, communication system 101 monitors the activity of the various services used by user 105 (Step 310). For example, communication system 101 monitors an instant messaging application to determine if user 105 has recently sent or received any instant messages. In another example, communication system 101 monitors a VoP application to determine if user 105 has recently sent or received any VoP communications. Next, communication system 101 determines if the status of user 105 has changed with respect to a first service (Step 320). For instance, communication system 101 could determine if user 105 become available for instant messaging after a period of inactivity. If the status has changed, communication system 101 transmits the first update message to access control system 111 (Step 330). If not, communication system 101 proceeds to determine if the status of user 105 has changed with respect to a second service (Step 340). If so, communication system 101 transmits the second update message to access control system 111. If not, communication system 101 continues with the monitoring process (Step 310).

Figure 4:
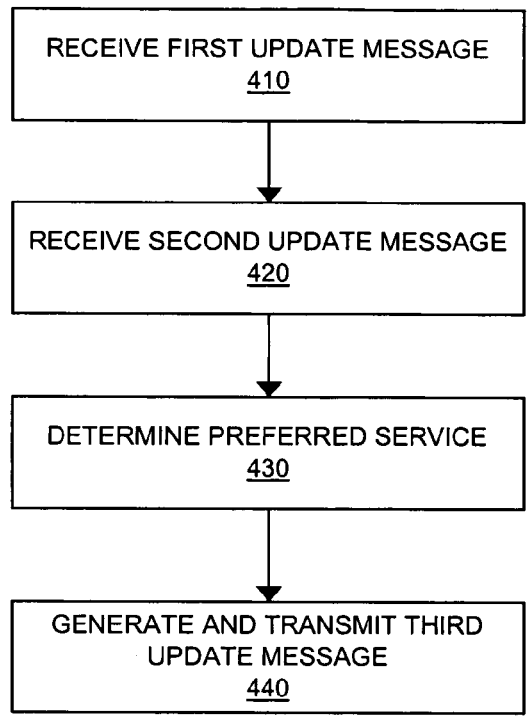
FIG. 4 illustrates the operation of an access control system in an embodiment of the invention.

FIG. 4 illustrates the operation of access control system 111 in an embodiment of the invention. To begin, access control system 111 receives the first update message from communication system 101 (Step 410). Next, access control system 111 receives the second update message (Step 420). Access control system 111 then processes the first and second update messages to determine the preferred service of the first and second services (Step 430). Upon determining the preferred service, access control system 111 generates and transmits a third update message to presence system 122 indicating the preferred service for user 105 (Step 440).

Advantageously, presence network 100 allows for improved network operations by determining on a user by user basis a preferred service for communicating with users. By determining a preferred service for a user, the overall bandwidth utilized in a network can be controlled. In addition, presence network 100 provides for reducing the immediate and indiscriminate use of services by primary user by notifying third party users in other communication networks.

Second Embodiment Configuration and Operation

FIGS. 5-7

Figure 5:
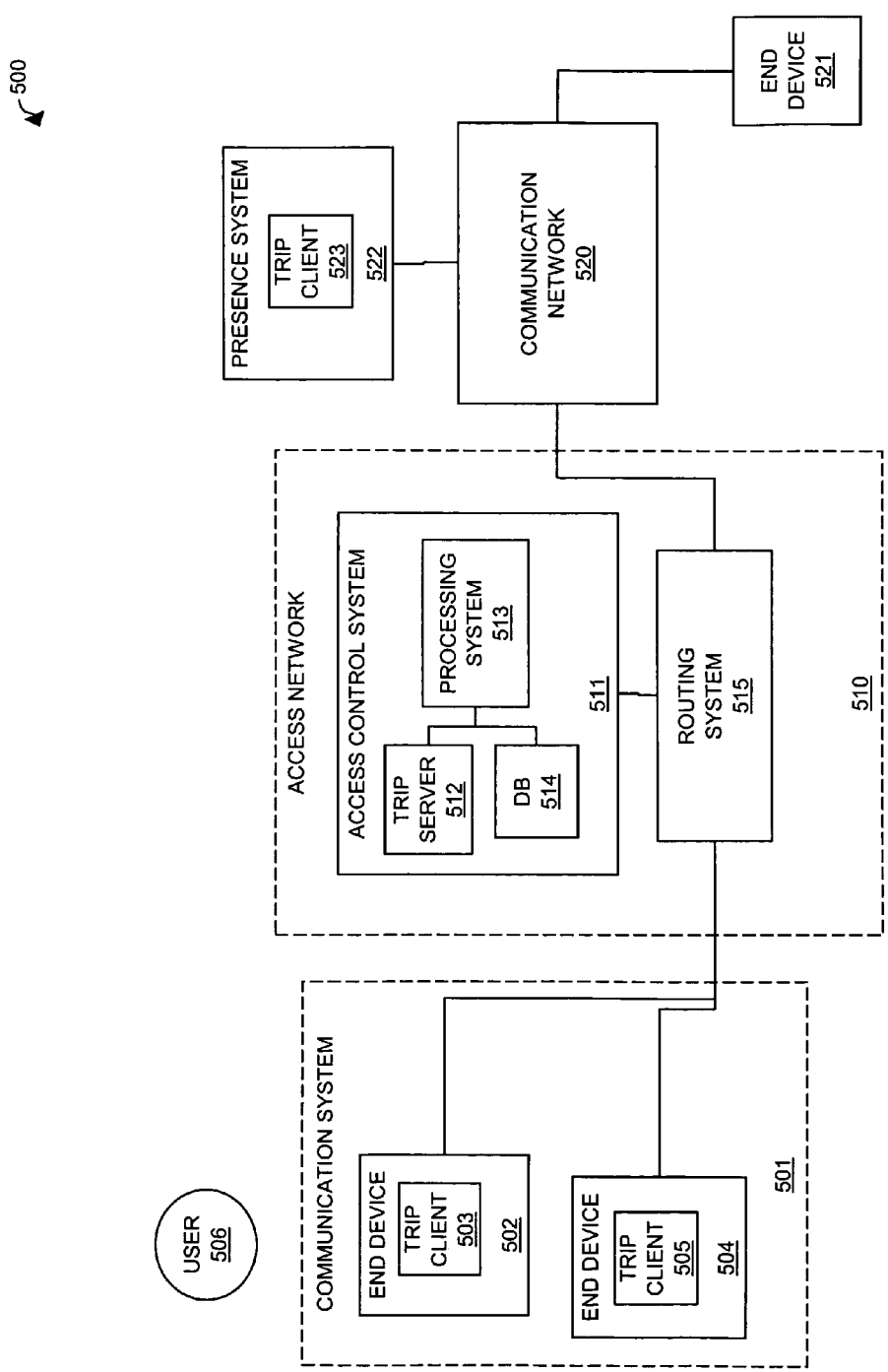
FIG. 5 illustrates a presence network in an embodiment of the invention.

FIG. 5 illustrates presence network 500 in an embodiment of the invention. Presence network 500 includes communication system 501 and communication network 520 coupled to access network 510. End device 521 is coupled to communication network 521. Presence system 522 is also coupled to communication network 520. Communication system 401 includes end device 502 and end device 504. End device 502 includes telephony routing over Internet protocol (TRIP) client 503. End device 504 includes TRIP client 505. Access network 510 includes routing system 525 and access control system 511. Access control system 511 includes TRIP server 512, processing system 513, and database system 514. Presence system 522 includes TRIP client 523.

In operation, access network 510 provides end device 502 and 504 with access to communication network 520. Access network 510 could be, for example, an enterprise network. Communication network 520 could be, for example, a network or collection of networks, such as the public Internet. End device 502 and 504 could be any kind of end device, such as mobile phones, desk phones, personal computing systems, personal digital assistants, or personal music or video systems. End device 521 could be any end device, including a mobile phone, personal computing systems, or plain old telephone service (POTS) phones, as well as other types of end devices. End device 521 could also be a content system, such as a content download system that provides content to end device 502 and 504.

Presence system 522 could be any presence system that updates and publishes the presence attributes of end users, such as user 506, with respect to various services. Routing system 515 could be any well known system capable of routing traffic to and from communication system 501 and communication network 520. Routing system 515 could include network elements such as routers, packet switches, border controllers, gateways, gateway controllers, and firewalls, as well as other types of network elements.

Access control system 511 controls access to access network 510 by determining a preferred service by which third parties access end device 502 and 504. The preferred service is determined based on the service requirements of a service, such as the required bandwidth required for the service, and based on the capabilities constraints of access network 510. For instance, a capability constraint could be the remaining capacity available on access network 510. Access control system 511 attempts to match the capacity of access network 510 with preferred methods of accessing end devices 502 and 504 in order to optimize the overall performance of access network 510.

Figure 6:
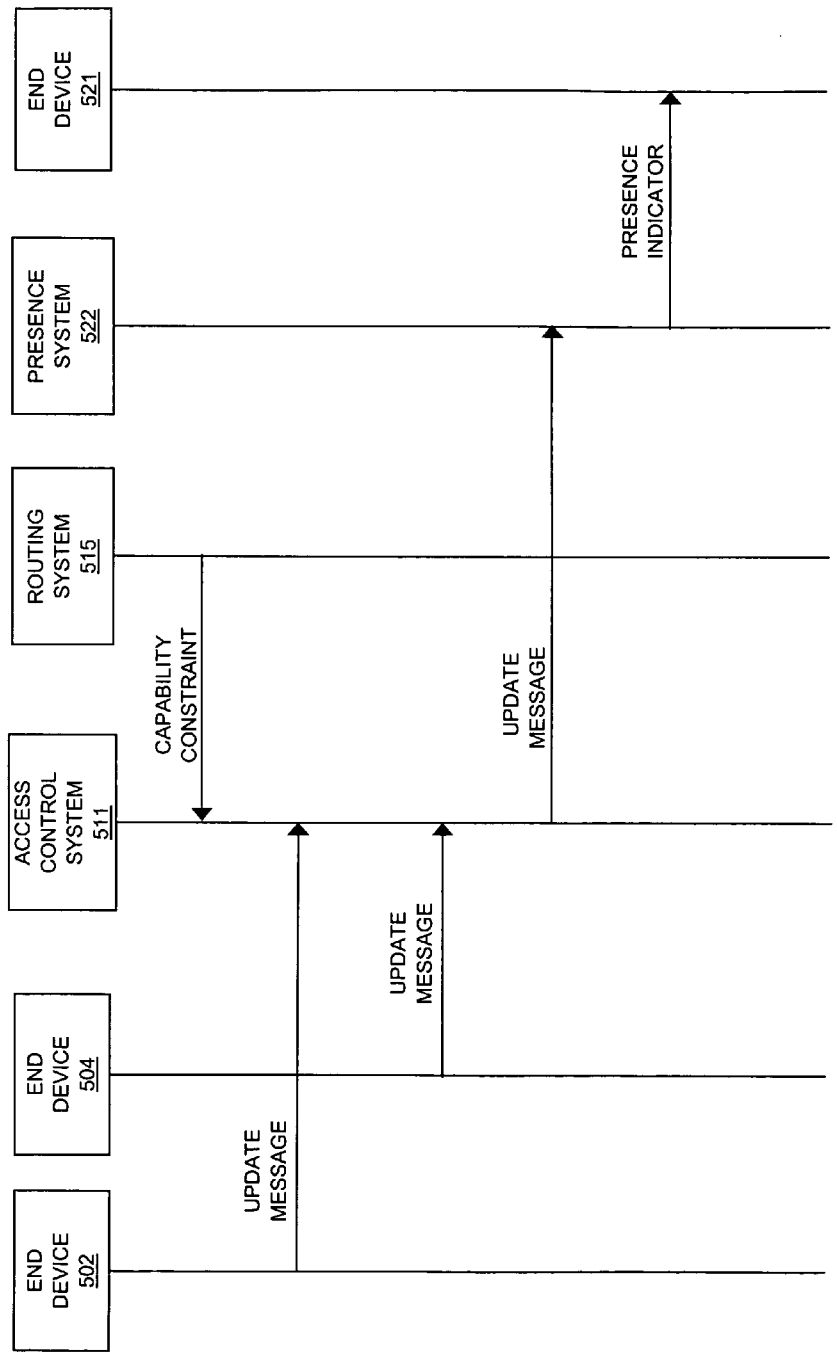
FIG. 6 illustrates a flow diagram in an embodiment of the invention.

FIG. 6 illustrates a flow diagram in an embodiment of the invention. To begin, routing system 522 notifies access control system 511 of a capability constraint. A capability constraint could be, for example, the capacity utilized of routing system 525, or a congestion level of a gateway or media gateway controller, as well as other capability constraints.

Upon detecting a status change for user 506 with respect to a first service, end device 502 transmits an update message to access control system 511 indicating the status change, the user, and the service. The update message could be, for example, a TRIP update message transmitted by TRIP client 503. Similarly, upon detecting a status change for user 506 with respect to a second service, end device 504 transmits an update message to access control system 511 indicating the status change, the user, and the service. The update message could be, for example, a TRIP update message transmitted by TRIP client 505. TRIP clients 503 and 505 could also be referred to as TRIP-lite clients.

Access control system 511 receives and processes the update messages with the capability constraint to determine a preferred access service for third parties to reach user 506. Access control system 511 then generates and transmits an update message for presence system 522 indicating the preferred service and the user. Presence system 522 receives the update message and transmits a new presence indicator to end device 521. As a result, a third party user using end device 521 will know how to reach user 506 using the preferred service.

Figure 7:
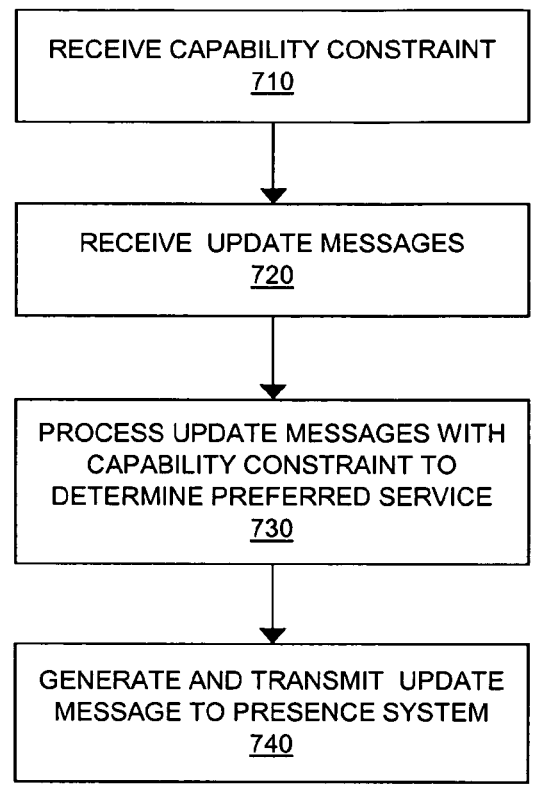
FIG. 7 illustrates the operation of an access control system in an embodiment of the invention.

FIG. 7 illustrates the operation of access control system 511 in an embodiment of the invention. To begin, access control system 511 receives the capability constraint from routing system 525 (Step 710). As discussed above, the capability constraint could be sent from any number of elements within routing system 525, such as a gateway, a border controller, or a media gateway controller, as well as other elements. In one case, TRIP enabled gateway could transmits a TRIP update message to TRIP server 512 indicating a capability constraint of the gateway. For instance, the capability constraint could indicate that the gateway is congested. The capability constraint could also indicate that the gateway is restricted to certain coding/decoding (codec) protocols. Other capability constraints include the time of day or the day of the week.

Next, access control system 511 receives the update messages from end devices 502 and 504 (Step 720). In the case of TRIP, TRIP server 512 would receive the TRIP update messages from end device 502 and 504 (Step 710). Processing system 513 processes the update messages to retrieve from database system 514 the service requirements associated with the services indicated in the update messages. A service requirement could be, for example, a codec type required by the service, or a bandwidth capacity required by the service, as well as other requirements.

Next, processing system 513 processes the service requirements with the capability constraint to determine which service satisfies the capability constraint (Step 730). For instance, if one service requires high bandwidth while the other service requires low bandwidth, and if the capability constraint indicates that a gateway is congested, then processing system 513 will select the low bandwidth service as the preferred service.

Upon determining the preferred service for accessing user 506, access control system 511 generates and transmits an update message to presence system 523 identifying the preferred service and the status of user 506 with respect to the service (Step 740). This update message could also be a TRIP update message. Presence system 522 then updates all the third parties interested in the presence status of user 506 with the preferred service information.

Advantageously, presence network 500 allows for improved network operations by determining on a user by user basis a preferred service for communicating with users. By determining a preferred service for a user, the overall bandwidth utilized in a network can be controlled. In addition, presence network 500 provides for reducing the immediate and indiscriminate use of services by primary user by notifying third party users in other communication networks.

Figure 8:
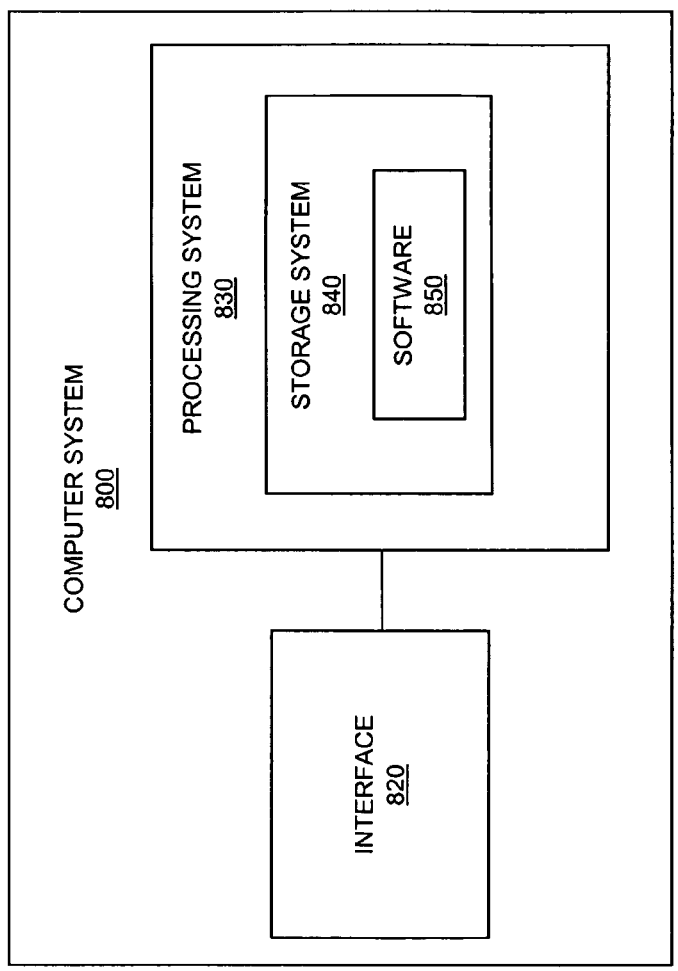
FIG. 8 illustrates a computer system in an embodiment of the invention.

FIG. 8 illustrates computer system 800 in an embodiment of the invention. Computer system 800 includes interface 820, processing system 830, storage system 840, and software 850. Storage system 840 stores software 850. Processing system 830 is linked to interface 820. Computer system 800 could be comprised of a programmed general-purpose computer, although those skilled in the art will appreciate that programmable or special purpose circuitry and equipment may be used. Computer system 800 may use a client server architecture where operations are distributed among a server system and client devices that together comprise elements 820-850.

Interface 820 could comprise a network interface card, modem, port, or some other communication device. Signaling interface 820 may be distributed among multiple communication devices. Interface 830 could comprise a computer microprocessor, logic circuit, or some other processing device. Processing system 830 may be distributed among multiple processing devices. Storage system 840 could comprise a disk, tape, integrated circuit, server, or some other memory device. Storage system 840 may be distributed among multiple memory devices.

Processing system 830 retrieves and executes software 850 from storage system 840. Software 850 may comprise an operating system, utilities, drivers, networking software, and other software typically loaded onto a general-purpose computer. Software 850 could also comprise an application program, firmware, or some other form of machine-readable processing instructions. When executed by the processing system 830, software 850 directs processing system 830 to operate as described for the elements of presence network 500.

Enterprise Network Example

In an embodiment of the invention involving an enterprise network, an access control system could be implemented to control access to end users of the enterprise network, thereby improving the overall performance of the network. In this embodiment, an end user, such as an employee, could have several ways to communicate with third parties either on the enterprise network or outside of the enterprise network. For example, the end user could have a VoIP enabled desk phone and a personal computer or workstation running an instant messaging (IM) application. It is desirable for the enterprise to control whether the employee talks on the phone, or alternatively chats using the IM application, because voice conversations require greater bandwidth and processing capacity than IM conversations.

Each access technology has associated presence features. For example, the employee can manually change a presence status setting on his desk phone to indicate when he is at his desk and available for calls. Similarly, the employee can manually change a presence status setting on the IM application to indicate his availability. It should be understood that many presence status settings are possible. Additionally, it should be understood that the end devices could automatically monitor for presence status changes.

Considering a situation whereby the employee changes both his phone and IM settings to available, each device could transmit an update message indicating the status change, the user, and the associated service. The update message from the phone could identify the user, the voice call service, and the new presence status. The update message could identify the user, the IM application service, and the new presence status for the user.

The update messages could be directly addressed to the access control system 511. Optionally the update messages could be addressed for a third party platform, such as presence server located outside the enterprise network on the public Internet. This could commonly occur in a situation where the end user has installed and is running a third party IM application. In such a case, monitoring tools in the enterprise network could monitor for and intercept presence update messages destined for third party presence servers outside of the enterprise network.

The access system receives and processes the update messages, along with performance information related to the overall performance of the enterprise network, to determine a preferred service for the user of the VoIP service and the IM application. The performance information could be, for instance, the overall capacity currently being used of the enterprise network. Other performance information could include the time of day or day of week. For example, the enterprise may desire to limit employee access depending upon general traffic patterns associated with certain times of day and days of the week. Thus, the preferred service could be the service requiring the least amount of processing capacity and bandwidth due to it being a time of day having a high traffic load. In another example, the performance information could indicate a security threat. In this case, the preferred service could be the service providing the highest level of security.

Upon determining the preferred service of either the VoIP service or the IM service, the access control system then updates a presence system with the identity of the user and the preferred service for the user. The presence system then updates other third party end users with the identity of the user and the preferred service for the user. For example, the access control system could determine that instant messaging is the best way to reach an employee and updates a presence system with the information. The presence system then updates third party end users with the same information. The end users then proceed to communicate with the employee using the instant messaging application, rather than placing voice calls to the employee, thereby conserving bandwidth on the network and improving network performance.

What is claimed is:

1. A presence management system comprising:
   a communication system comprising at least one end device configured to transmit a first update message indicating a first presence status of a user for a first service, and transmit a second update message indicating a second presence status of the user for a second service;
   an access control system within an access network that provides the communication system with access to a communication network, the access control system configured to receive the first and second update messages, process the first and second update messages with a capability constraint of the access network to determine a preferred service for the user of the first and second services, and transmit a third update message to a presence system indicating the user and the preferred service for the user wherein the presence system updates a presence indicator for the user to indicate the preferred service.

2. The presence management system of claim 1 wherein the access control system determines the preferred service based on a first service requirement for the first service and a second service requirement for the second service.

3. The presence management system of claim 2 wherein the access control system determines the preferred service based on the first service requirement for the first service and the second service requirement for the second service by processing the first service requirement and the second service requirement with the capability constraint of the access network to determine which of the first service requirement or the second service requirement satisfies the capability constraint of the access network.

4. The presence management system of claim 3 wherein the capability constraint comprises a bandwidth constraint, the first service requirement comprises a first bandwidth requirement, and the second service requirement comprises a second bandwidth requirement.

5. The presence management system of claim 2 wherein the first service comprises a voice over packet service.

6. The presence management system of claim 5 wherein the second service comprises an instant messaging service.

7. The presence management system of claim 6 wherein the communication system comprises a first device and a second device wherein the first device corresponds to the first service and wherein the second device corresponds to the second service.

8. An access control system comprising:
   a network card configured to receive a first update message indicating a first presence status of a user for a first service, and receive a second update message indicating a second presence status of the user for a second service;
   a processing system coupled to the network card, the processing system configured to process the first and second update messages with a capability constraint of an access network to determine a preferred service for the user of the first and second services, and generate a third update message indicating the user and the preferred service for the user wherein a presence system updates a presence indicator for the user to indicate the preferred service; and
   the network card further configured to transmit the third update message to a presence system.

9. The access control system of claim 8 wherein the access control system determines the preferred service based on a first service requirement for the first service and a second service requirement for the second service.

10. The access control system of claim 9 wherein the access control system determines the preferred service based on the first service requirement for the first service and the second service requirement for the second service by processing the first service requirement and the second service requirement with the capability constraint of the access network to determine which of the first service requirement or the second service requirement satisfies the capability constraint of the access network.

11. The access control system of claim 10 wherein the capability constraint comprises a bandwidth constraint, the first service requirement comprises a first bandwidth requirement, and the second service requirement comprises a second bandwidth requirement.

12. The access control system of claim 9 wherein the first service comprises a voice over packet service.

13. The access control system of claim 12 wherein the second service comprises an instant messaging service.

14. A method of operating an access control system comprising:
   receiving a first update message indicating a first presence status of a user for a first service;
   receiving a second update message indicating a second presence status of the user for a second service;
   processing the first and second update messages with a capability constraint of an access network to determine a preferred service for the user of the first and second services;
   generating a third update message indicating the user and the preferred service for the user wherein a presence system updates a presence indicator for the user to indicate the preferred service; and
   transmitting the third update message to a presence system.

15. The method of claim 14 comprising determining the preferred service based on a first service requirement for the first service and a second service requirement for the second service.

16. The method of claim 15 wherein determining the preferred service based on the first service requirement for the first service and the second service requirement for the second service comprises processing the first service requirement and the second service requirement with the capability constraint of the access network to determine which of the first service requirement or the second service requirement satisfies the capability constraint of the access network.

17. The method of claim 16 wherein the capability constraint comprises a bandwidth constraint, the first service requirement comprises a first bandwidth requirement, and the second service requirement comprises a second bandwidth requirement.

18. The method of claim 15 wherein the first service comprises a voice over packet service.

19. The method of claim 18 wherein the second service comprises an instant messaging service.

* * * * *